(12) United States Patent
Lu et al.

(10) Patent No.: US 9,633,211 B2
(45) Date of Patent: Apr. 25, 2017

(54) METHOD FOR REALIZING SECURE COMMUNICATION

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 340 days.

(21) Appl. No.: 14/388,870

(22) PCT Filed: Jun. 30, 2014

(86) PCT No.: PCT/CN2014/081138
§ 371 (c)(1),
(2) Date: Sep. 29, 2014

(87) PCT Pub. No.: WO2015/085754
PCT Pub. Date: Jun. 18, 2015

(65) Prior Publication Data
US 2016/0232360 A1     Aug. 11, 2016

(30) Foreign Application Priority Data

Dec. 10, 2013   (CN) .......................... 2013 1 0664801

(51) Int. Cl.
| | |
|---|---|
| *G06F 21/60* | (2013.01) |
| *H04L 9/08* | (2006.01) |
| *H04L 9/14* | (2006.01) |
| *G06F 13/42* | (2006.01) |
| *G06K 19/04* | (2006.01) |

(52) U.S. Cl.
CPC ........ *G06F 21/602* (2013.01); *G06F 13/4282* (2013.01); *G06K 19/04* (2013.01); *H04L 9/0891* (2013.01); *H04L 9/14* (2013.01)

(58) Field of Classification Search
CPC ...................................................... G06F 21/602
USPC ......................................................... 713/189
See application file for complete search history.

(56) References Cited

U.S. PATENT DOCUMENTS

2013/0275745 A1   10/2013   Gundelfinger

*Primary Examiner* — Jacob Lipman
(74) *Attorney, Agent, or Firm* — Hammer & Associates, P.C.

(57) ABSTRACT

A method for realizing secure communication, comprises: Step 1, a card reader is powered on, determine a system working mode, perform an apple device verification and execute Step 2 if the system working mode is apple mode; execute Step 2 if the system working mode is USB mode; Step 2, wait for receiving an instruction, determine a first preset byte of the instruction, perform corresponding operation if the first preset byte is a first preset value; decrypt the instruction according to an initial encryption key, a key serial number and an algorithm corresponding to an algorithm flag, send the decrypted instruction to a card and execute Step 3 if the first preset byte is a second preset value; Step 3, when data returned by the card is received, the key serial number is updated, the algorithm according to the algorithm flag, the initial encryption key and the updated key serial number are configured to encrypt the data returned by the card, send the encrypted data to an upper computer via a corresponding interface according to the system working mode. According to the present invention, after a key agreement between the card reader and the upper computer, the key is updated, data is encrypted or decrypted by the updated key to improve safety of data communication.

16 Claims, 8 Drawing Sheets

METHOD FOR REALIZING SECURE COMMUNICATION

FIELD OF THE PRESENT INVENTION

The present invention relates to information security field, in particular, to a method for realizing secure communication, which is to improve security of data communication.

PRIOR ART

A card reader is a device which connects a smart card and a host. With a smart card, a card reader is configured to read data inside the smart card or write data sent by a host into the smart card, so as to realize data interaction between the smart card and the host.

However, in prior art, in a process of data interaction between a smart card and a host, the data is easily intercepted or monitored.

SUMMARY OF THE PRESENT INVENTION

The object of the present invention is to provide a method for realizing secure communication, so as to improve security of data communication.

Thus, the present invention provides a method for realizing secure communication, comprising:

Step S1, powering on a card reader and beginning to initialization, wherein the initialization includes that set a decryption flag, initialize an algorithm flag and set a decryption way as bi-directional decryption;

Step S2, determining a system working mode, executing Step S3 in a case that the system mode is an apple mode; executing Step S4 in a case that the system mode is a USB mode;

Step S3, beginning to perform an apple device certification, determining whether the apple device certification is successfully performed, executing Step S4 if the apple device certification is successfully performed; returning to Step S2 if the apple device certification is not successfully performed;

Step S4, waiting, by the card reader, for receiving an instruction, when the instruction is received, a first preset byte of the instruction is determined, executing Step S5 if it is a first preset value; executing Step S6 if it is a second preset value; performing corresponding operation and returning to Step S4 if it is other value;

Step S5, determining type of the instruction according to a second preset byte of the instruction, if the instruction is a first instruction, setting the decryption flag, the algorithm flag and the decryption way according to the first instruction, and sending a first response to an upper computer via a corresponding interface according to the system working mode, and returning to Step S4; if the instruction is a second instruction, updating an initialized encryption key and a key serial number according to the second instruction, and sending a second response to the upper computer via a corresponding interface according to the system working mode, and returning to Step S4; if the instruction is a third instruction, obtaining the key serial number from the card reader, and sending a third response to the upper computer via a corresponding interface according to the system working mode, and returning to Step S4;

Step S6, determining whether the decryption flag is set, executing Step S7 if the decryption flag is set; otherwise, sending the received instruction to the card, and waiting for receiving data returned by the card, when the data is received, sending the data to the upper computer via corresponding interface according to the system working mode, and returning to Step S4;

Step S7, determining the decryption way, in a case that it is a bi-directional decryption, obtaining the initial encryption-key and the key serial number from the card reader, decrypting the key according to the initial encryption-key and the key serial number, decrypting a cyptertext in the received instruction in accordance with a algorithm corresponding to the algorithm flag and the decryption key to obtain a decrypted instruction, sending the decrypted instruction to the card, and waiting for receiving the data returned by the card, executing Step S8; in a case that the decryption way is an unidirectional decryption, sending the received instruction to the card, waiting for receiving the data received by the card, and executing Step S8;

Step S8, when the data returned by the card is received by the card reader, updating the key serial number according to a preset way, the algorithm corresponding to the algorithm flag, the initial encryption-key and the key serial number are configured to encrypt the data returned by the card to a ciptertext of the returned data; sending the ciptertext to the upper computer according to the system working mode via a corresponding interface, and returning to Step S4;

Preferably, updating the initial encryption-key and the key serial number in the card reader according to the second instruction specifically including:

obtaining, by the card reader, the initial encryption-key and making the key as a current key; the algorithm corresponding to the algorithm flag and the current key is configured to decrypt the ciptertext in the second instruction to get a plaintext in the second instruction; determining whether the plaintext is legitimate, updating the initial encryption-key and the key serial number according to the plaintext in the second instruction if the plaintext is legitimate; reporting an error to the upper computer according to the system working mode via a corresponding interface, and returning to Step S4 if the plaintext is not legitimate.

Preferably, obtaining, by the card reader, the initial encryption-key and making the key as the current key specifically is that determine whether an initial encryption-key exist in the card reader, obtaining the initial encryption-key from the card reader and making it as the current encryption-key if an initial encryption-key exist in the card reader; making a default initial encryption-key as the current if no initial encryption-key exist in the card reader.

Preferably, determining whether the plaintext in the second instruction is legitimate specifically including:

verifying whether a length of the plaintext in the second instruction is legitimate, verifying whether a filled character of the plaintext in the second instruction is legitimate, and verifying whether a check code of the plaintext in the second instruction is legitimate;

if the length of the plaintext in the second instruction, the filled character of the plaintext in the second instruction and the check code of the plaintext in the second instruction are legitimate, the plaintext in the second instruction is legitimate; otherwise, the plaintext in the second instruction is not legitimate;

Preferably, verifying whether the length of the plaintext in the second instruction is legitimate specifically including that determine whether the length equals a first preset length, the length of the second instruction is legitimate if it equals the first preset length; sending a first error response to the upper computer according to the system working mode via a corresponding interface, and returning to Step S4 if the length of the second instruction is not legitimate;

verifying whether the filled character of the plaintext in the second instruction is legitimate specifically including: obtaining, by the card reader, the filled character from the plaintext in the second instruction, determining whether the filled character matches with a sixth preset value, the filled character is legitimate if it matches with a sixth preset value; otherwise, sending a second error response to the upper computer according to the system working mode via a corresponding interface, and returning to Step S4;

verifying whether the check code in the plaintext in the second instruction is legitimate specifically including: calculating, by the card reader, an appointed part in the plaintext in the second instruction to get a verification result, obtaining the check code from the plaintext in the second instruction, and determining whether the check code is identical to the verification result, the check code in the plaintext in the second instruction is legitimate if the check code is identical to the verification result; otherwise, sending a third error response to the upper computer according to the system working mode via a corresponding interface, and returning to Step S4.

Preferably, comprising, the key serial number, a count value of the key serial number;

updating the key serial number in accordance with the preset way specifically is that the count value of the key serial number is updated.

Preferably, that the algorithm corresponding to the algorithm flag, the initial encryption-key and the key serial number are configured to encrypt the data returned by the card in Step S8 specifically comprising:

Step F1, transcoding, by the card reader, the data returned by the card to American national standard code for information interchange data, obtaining a length of a data which is get by deleting the last byte of American national standard code for information interchange data, and making the length of the data as a first length;

Step F2, performing, by a first data, modular operation on the first length to obtain a result, making the result as a second length;

Step F3, starting from a low-order end of the data obtained by deleting the last byte of American national standard code for information interchange data, the bit is filled by a second data of the second length to obtain a cover-positioned data, the algorithm corresponding to the algorithm flag, the initial encryption-key and the key serial number are configure to encrypt the fill-bit data.

Preferably, initialization in Step S1 specifically is that the algorithm flag is initialized, decryption flag is set;

Setting the decryption flag, the algorithm flag and the decryption way according to the first instruction in a case the instruction is the first instruction in Step S5 specifically including: setting the decryption flag and the algorithm flag according to the first instruction if the instruction is the first instruction;

Step S6 to Step S8 may be replaced with Step S6' to Step S8', respectively:

Step S6', determining whether an instruction word of the received instruction is the preset value, sending the received instruction to the card, waiting for receiving the data returned by the card, and executing Step S8' if the instruction word is the preset value; otherwise, obtaining the initial encryption-key and the key serial number from the card reader, calculating decryption key according to the initial encryption-key and the key serial number, the algorithm corresponding to the algorithm flag and the decryption key are configured to decrypt the received instruction to get the decrypted result; executing Step S7';

Step S7', determining whether an instruction word of the decrypted result is the preset value, setting the decryption flag, sending the decrypted result to the card, waiting for receiving the data returned by the card, and executing Step S8' if the instruction word of the decrypted result is the preset value; otherwise, sending a response that the received data does not meet a condition of the operation to the upper computer according to the system working mode via a corresponding interface, returning to Step S2;

Step S8', when receiving, by the card reader, the data returned by the card, determining whether the decryption flag is set, if the flag is set, resetting the decryption flag, obtaining the initial pin encryption and the key serial number from the card reader, updating the key serial number according to the preset way, calculating encryption key in accordance with the initial pin encryption and the key serial number, making the serial number as the updated key serial number in the card reader, encrypting the data returned by the card according to the encryption key and the algorithm corresponding to algorithm flag and the encryption key to get the encrypted result, sending the encrypted result to the upper computer according to the system working mode via a corresponding interface, and returning to Step S2.

Preferably, the initialization in Step S1 further including: turning on interruption, wherein interruption includes apple interface receiving data interruption and USB interface receiving data interruption;

when receiving, by the card reader, data via an apple interface, entering apple interface receiving data interruption; wherein apple interface receiving data interruption comprises:

Step G1, determining whether an apple interface receiving interruption flag is set, executing Step G2 if the flag is set; exiting apple interface receiving data interruption if the flag is not set;

Step G2, clearing the interruption flag, determining whether data finish being received, setting an apple interface receiving data finish flag and exiting apple interface receiving data interruption if the data finish being received; exiting apple interface receiving data interruption if the data do not finish being received;

when receiving, by the card reader, the data via a USB interface, entering USB receiving data interruption; wherein USB receiving data interruption specifically comprises:

Step H1, determining whether a USB receiving data interruption flag is set, executing Step H2 if the flag is set; exiting USB receiving data interruption if the flag is not set;

Step H2, clearing the interruption flag, determining whether the data finish being received, setting a USB receiving data finish flag and exiting USB receiving data interruption if the data finish being received; exiting USB receiving data interruption if the data do not finish being received;

Step S2 to Step S4 may be replaced with Step S2' to Step S4', respectively:

Step S2', determining, by the card reader, whether the apple interface receiving data finish flag is set, resetting the apple interface receiving data finish flag, setting an apple interface sending data flag, and executing Step S4' if the flag is set; executing Step S3' if the flag is not set;

Step S3', determining whether the USB receiving data finish flag is set, resetting the USB receiving data finish flag, setting a USB sending data flag, and executing Step S4' if the flag is set; returning to Step S2' if the flag is not set;

Step S4', determining a first preset byte of the received instruction, executing Step S5 if the first preset byte is the first preset value; executing Step S6' if the first preset byte is the second preset value; performing corresponding operation and returning to Step S2' if the first preset byte is other value;

the process of sending a response that the received data does not meet a condition of the operation to the upper computer according to the system working mode via a corresponding interface, returning to Step S2 in Step S7' is replaced with Steps from Step S7'-1 to Step S7'-2:

Step S7'-1, determining whether the apple interface sending data flag is set, resetting the apple interface sending data flag, sending the response that the received data does not meet the condition of the operation to the upper computer via the apple interface, and returning to Step S3' if the apple interface sending data flag is set; otherwise, executing Step S7'-2;

Step S7'-2, determining whether the USB sending data flag is set, resetting the USB sending data flag, returning the response that the received data does not meet the condition of the operation to the upper computer via the USB interface, and returning to Step S2' if the USB sending data flag is set; otherwise, returning to Step S2;

returning to Step S4 in Step S5 is replaced with returning to Step S2';

sending the encrypted result to the upper computer via a corresponding interface according to the system working mode and returning to Step S2 in Step S8' is replaced with Steps from Step S8'-1 to Step S8'-2:

Step S8'-1, determining whether the apple sending data flag is set, resetting the apple sending data flag, sending the encrypted result to the upper computer via the apple interface, and returning to Step S3' if the apple sending flag is set; otherwise, executing Step S8'-2;

Step S8'-2, determining whether the USB sending data flag is set, resetting the USB sending data flag, sending the encrypted result to the upper computer via the USB interface, and returning to Step S2' if the USB sending data flag is set; otherwise, returning to Step S2'.

Preferably, obtaining the filled character from the plaintext in the second instruction specifically is that starting from a third preset byte of the plaintext in the second instruction, obtain data of a second preset length, and make the data as the filled character.

Preferably, obtaining the check code from the plaintext in the second instruction specifically is that starting from a fourth preset byte of the plaintext in the second instruction, obtain data of a fourth preset length, and make the data as the check code.

Preferably, obtaining the appointed part from the plaintext in the second instruction specifically is that starting from the first preset byte of the plaintext in the second instruction, obtain data of a third preset length.

Preferably, obtaining the initial pin encryption and the key serial number from the plaintext in the second instruction specifically comprising:

starting from the first preset byte of the plaintext in the second instruction, obtain data of a fifth preset length and make the data as the initial pin encryption; starting from a fifth preset byte of the plaintext in the second instruction, obtain data of a sixth preset length and make the data as the key serial number.

Preferably, choosing a corresponding interface according to the system working mode specifically is that determine the system working mode, choosing the apple interface if the system working mode is apple mode; choosing the USB interface is the system working mode is USB mode.

Preferably, determining the system working mode in Step S2 specifically comprising:

Step Y1, determining whether the card reader connects to the upper computer via an apple interface, the system working mode is apple mode if the card reader connects to the upper computer via an apple interface; otherwise, executing Step Y2;

Step Y2, determining whether the card reader connects to the upper computer via a USB interface, the system working mode is USB mode if the card reader connects to the upper computer via a USB interface; otherwise, returning to Step Y1 after a preset time.

Preferably, determining the system working mode specifically comprising:

Step Y1', determining whether the card reader connects to the upper computer via a USB interface, the system working mode is USB mode if the card reader connects to the upper computer via a USB interface; otherwise, executing Step Y2';

Step Y2', determining whether the card reader connects to the upper computer via an apple interface, the system working mode is apple mode is the card reader connects to the upper computer via an apple interface; otherwise, returning to Step Y1' after a preset time.

Advantages of the present invention is that according to the method provided by the invention, after the key is consulted by the card reader and the upper computer, the key is updated, the updated key is configured to encrypt or decrypt data to improve security of data communication.

BRIEF DESCRIPTION OF ACCOMPANYING DRAWINGS

FIG. 3-1 and FIG. 3-2 are flowcharts of a way of determining decryption automatically according to Embodiment 2 of the present invention;

FIG. 4-1 and FIG. 4-2 are flowcharts of a way of determining decryption automatically according to Embodiment 3 of the present invention;

DETAILED DESCRIPTION OF EMBODIMENTS OF THE PRESENT INVENTION

The technical solution in the embodiments of the present invention is further described more clearly and completely with the drawings in the embodiments of the present invention. Apparently, embodiments described are just a few of all embodiments of the present invention. On the basis of embodiments of the invention, all other related embodiments made by common technicians of the field without creative work belong to the scope of the invention.

Embodiments of the present invention provide a method for realizing secure communication, which is used in a process that an encrypted instruction sent by an upper computer is decrypted by a card reader, and the decrypted instruction is sent to a card, when data is returned by the card, the data returned by the card is encrypted by the card reader, and the encrypted data is sent to the upper computer.

Embodiment 1

Figure 1:
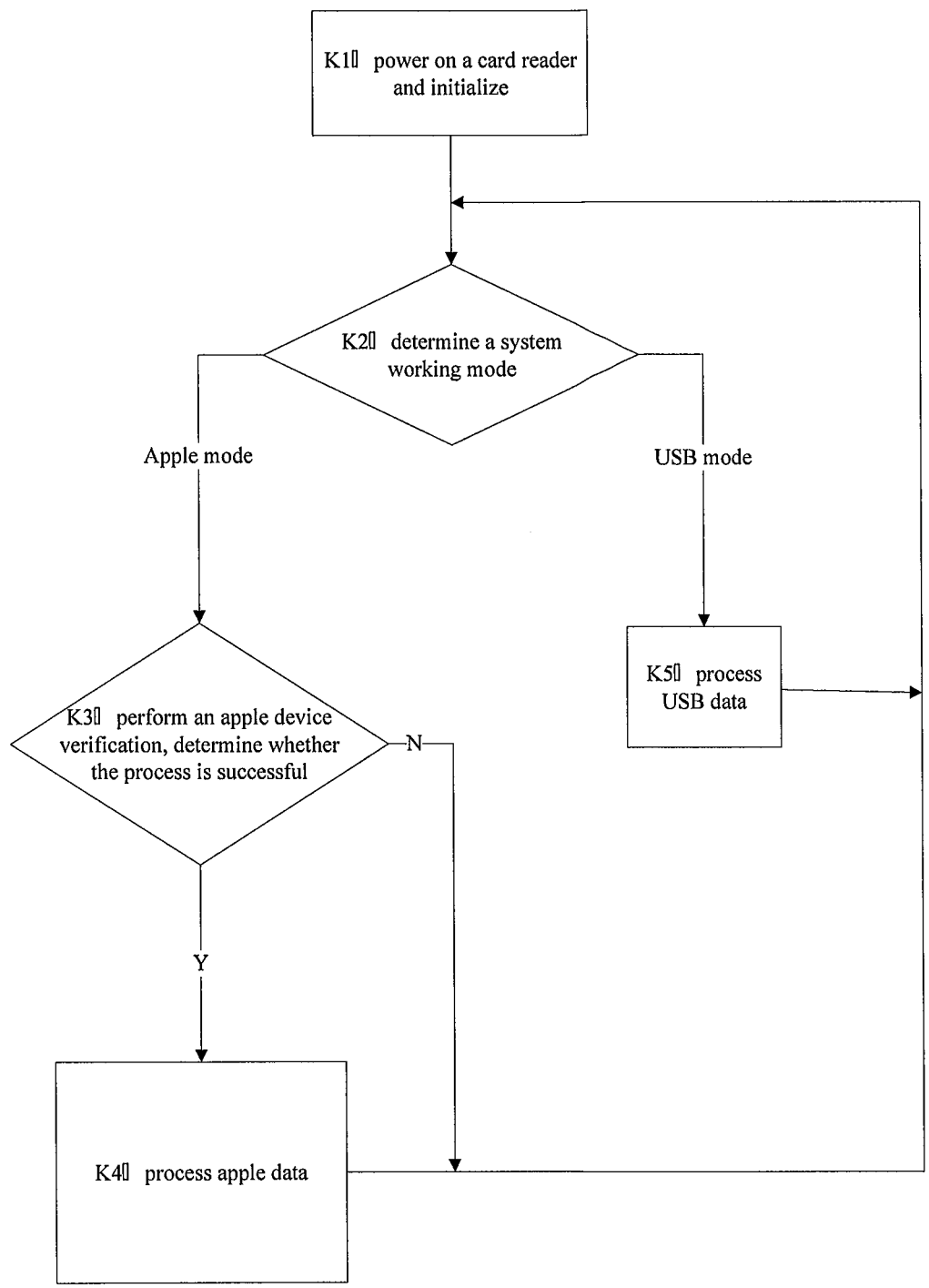
FIG. 1, FIG. 2-1 and FIG. 2-2 are flowcharts of a secure communication method according to Embodiment 1 of the present invention.

Embodiment 1 of the present invention provides a method for realizing secure communication, as showed in FIG. 1, the method includes:

Step K1, a card reader is powered on and initialized;

Step K2, determine a system working mode, execute Step K3 if the system working mode is apple mode; execute Step K5 if the system working mode is USB mode;

In Embodiment 1, preferably, an initial system working mode is USB mode; the method for determining the system working mode includes that determine whether the card reader connects to an apple device via an apple interface after the card reader is powered on and initialized, if yes, the system working mode is apple mode; if no, determine whether the card reader connects to a USB device via a USB interface, the system mode is USB mode if the card reader connects to a USB device via a USB interface; otherwise, continue to determine whether the card reader connects to an apple device via an apple interface after a preset time; or after the card reader is powered on and initialized, determine whether the card reader connects to a USB device via a USB interface, if yes, the system working mode is USB mode; if no, determine whether the card reader connects to an apple device via an apple interface, the system working mode is apple mode if the card reader connects to the apple device via an apple interface; otherwise, continue to determine whether the card reader connects to a USB device via a USB interface after the preset time.

Step K3, perform an apple device certification, determine whether the certification is successfully performed, if yes, execute Step K4; if no, return to Step K2;

Step K4, apple data is processed; return to Step K2;

Step K5, USB data is processed; return to Step K2.

Figures 1, 2:
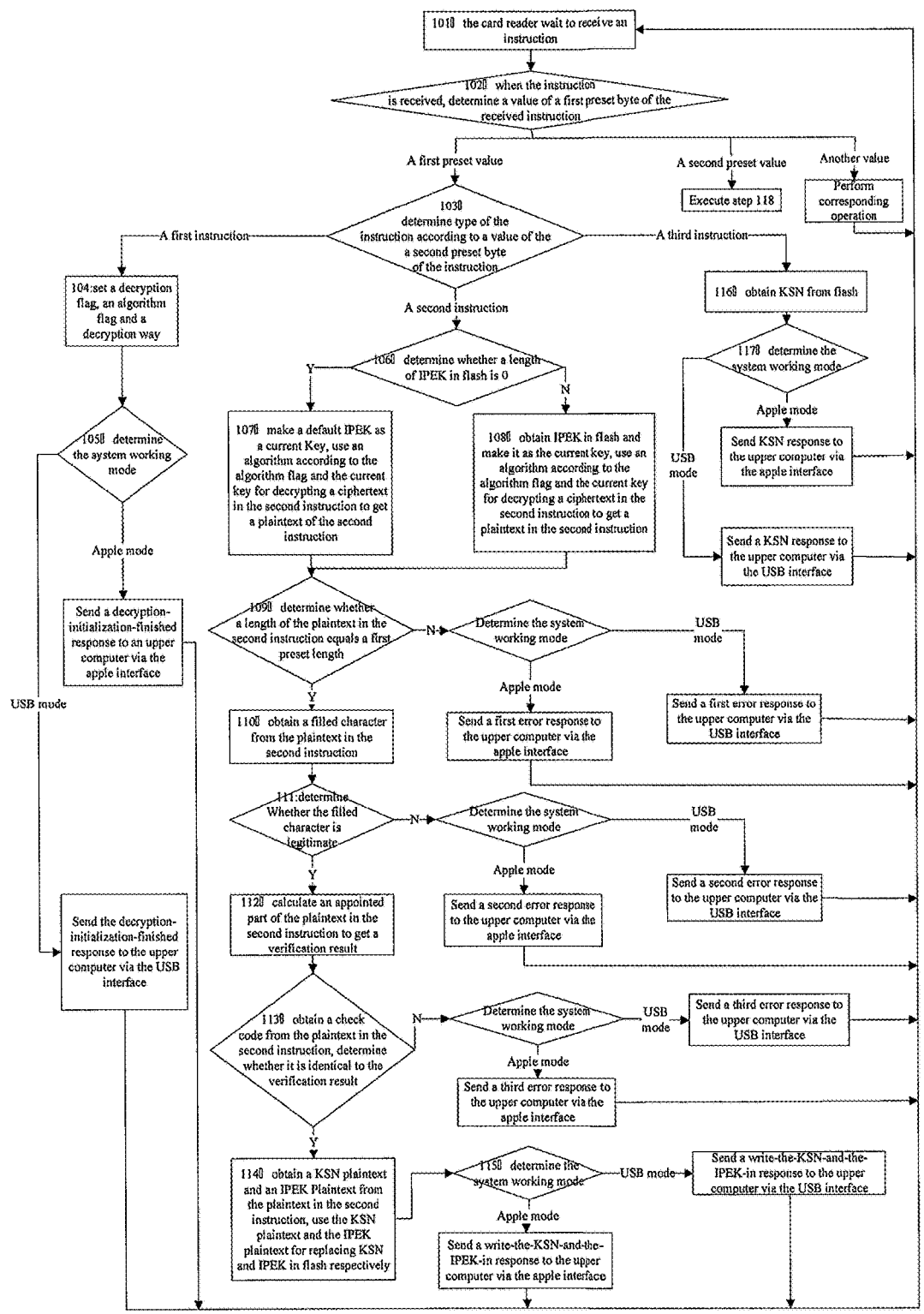
Figure 2:
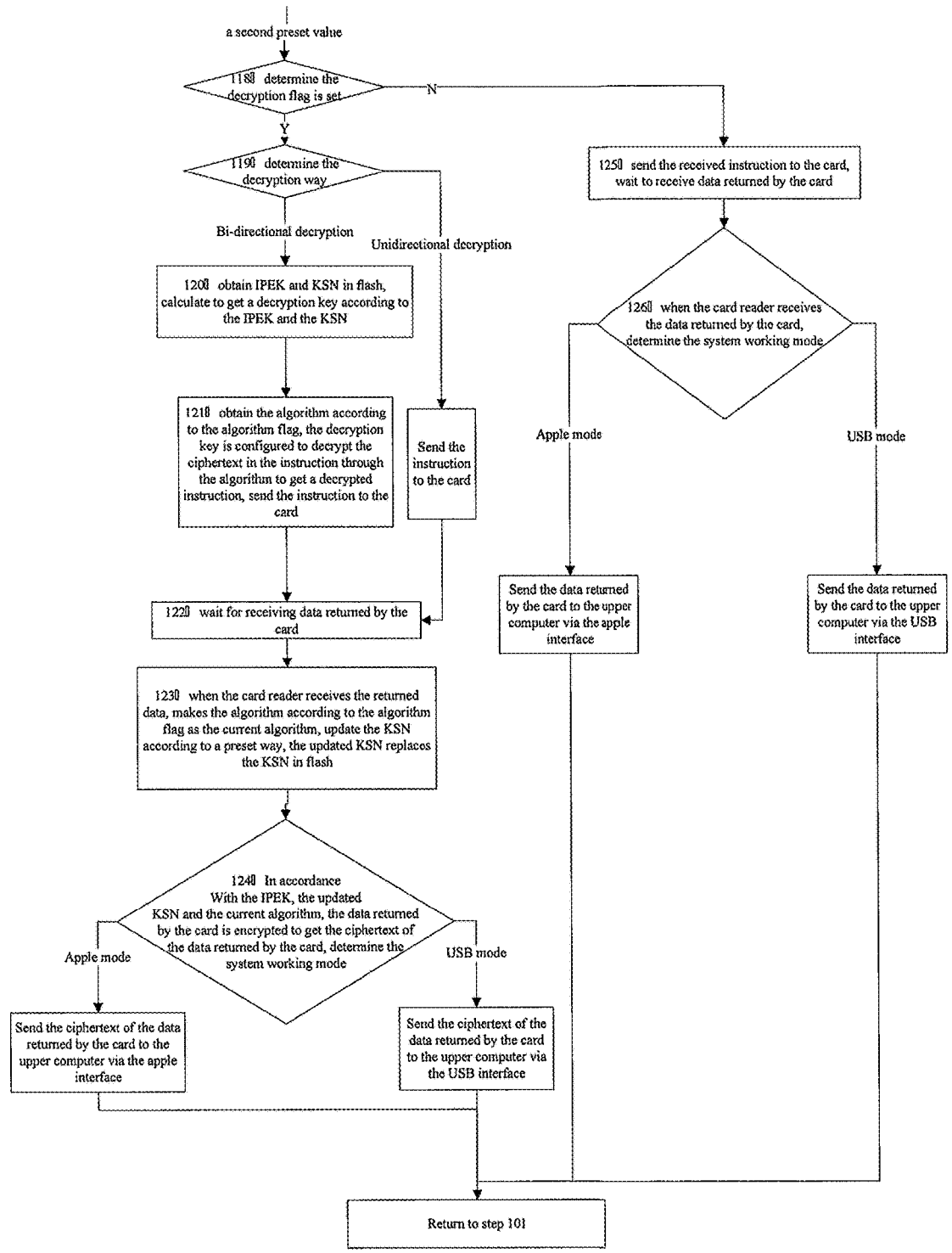

As shown in FIG. 2-1 and FIG. 2-2, in Embodiment 1, the method for processing the USB data is identical to the method for processing the apple data, the method specifically comprises:

Step 101, the card reader waits for receiving an instruction;

In Embodiment 1, the instruction is received by the card reader via an apple interface or a USB interface.

Step 102, when the instruction is received, determine a value of a first preset byte of the received instruction; execute Step 103 to Step 117 if the value is a first preset value; execute Step 118 to Step 126 if the value is a second preset value; perform corresponding operation and return to Step 101 if the value is other value;

In Embodiment 1, preferably, the first preset byte is the first byte of the instruction, the first preset value is 0x6B, and the second preset value is 0x6F.

Step 103, determine type of the instruction according to a value of a second preset byte of the instruction, execute Step 104 if the instruction is a first instruction; execute Step 106 if the instruction is a second instruction; execute Step 116 if the instruction is a third instruction;

In Embodiment 1, if the value of the second preset bytes equal a third preset value, the instruction is the first instruction;

If the value of the second preset bytes equal a fourth preset value, the instruction is the second instruction;

in which, the second instruction comprises an instruction header and a ciphertext, and the ciphertext is consisted of a KSN (Key Serial Number), an IPEK (Initial Pin Encryption), a filled character and a check code;

If the value of the second preset bytes of the instruction equals a fifth preset value, the instruction is the third instruction;

Preferably, the second preset bytes are bytes from a eleventh byte to a twelfth byte of the instruction, the third preset value is 0x5B01, the fourth preset value is 0x5B02, and the fifth preset value is 0x5B03;

When the first instruction is received by the card reader, execute Step 104 and Step 105 to set a decryption flag, an algorithm flag and a decryption way inside the card reader;

Step 104, set the decryption flag, the algorithm flag and the decryption way;

In Embodiment 1, the decryption flag, the algorithm flag and the decryption way are set in the card reader. Wherein, the decryption flag is set as resetting or setting, resetting the decryption flag means disable decryption, setting the decryption flag means enable decryption; the algorithm flag comprises a first algorithm flag and a second algorithm flag, preferably, the first algorithm flag is corresponding to 3DES algorithm, the second algorithm is corresponding to AES algorithm; the decryption way comprises unidirectional decryption and bi-directional decryption; preferably, when the card reader is initialized, the decryption flag is reset, the algorithm flag is set as the first algorithm flag, and the decryption way is set as bi-directional decryption.

Step 105, determine the system working mode, a decryption-initialization-finished response is sent to the upper computer via the apple interface and return to Step 101 if the system working mode is apple mode; the decryption-initialization-finished response is sent to the upper computer via the USB interface and return to Step 101 if the system working mode is USB mode;

In Embodiment 1, the decryption-initialization-finished response comprises a decrypt-initialization-state-character, in a case that the decrypt-initialization-state-character is 0x9000, the decryption flag, the algorithm flag and the decryption way are successfully set; in a case that the decrypt-initialization-state-character is other value, the decryption flag, the algorithm flag and the decryption way are not successfully set.

When the second instruction is received by the card reader, execute Steps from Step 106 to Step 115 to realize that the KSN and the IPEK inside the card reader are set by the card reader;

Step 106, determine whether a length of the IPEK in flash equals 0, if yes, execute Step 107; if no, execute Step 108;

Step 107, a default IPEK is made as a current key, the current key is configured to decrypt the ciphertext in the second instruction through an algorithm corresponding to the algorithm flag to obtain a plaintext in the second instruction; execute Step 109;

In Embodiment 1, a length of the default IPEK is 16 bytes;

Step 108, the IPEK in flash is obtained and made as a current key, the current key is configured to decrypt the ciphertext in the second instruction through the algorithm corresponding to the algorithm to obtain the plaintext in the second instruction; execute Step 109;

Preferably, the plaintext in the second instruction comprises an IPEK, a KSN, a filled character, and a check code; wherein the length of the IPEK is 16 bytes, a length of the KSN is 10 bytes, a length of the filled character is 2 bytes, and a length of the check code is 4 bytes;

Step 109, determine whether a length of the plaintext in the second instruction equals a first preset length, if yes, execute Step 110; if no, determine the system working mode, send a first error response to the upper computer via the apple interface and return to Step 101 in a case that the system working mode is apple mode; send the first error response to the upper computer via the USB interface and return to Step 101 in a case that the system working mode is USB mode;

In Embodiment 1, the first preset length is 32 bytes, the first error response is 0X6700;

Step 110, the filled character is obtained from the plaintext in the second instruction;

In Embodiment 1, starting from a third preset byte of the second instruction, obtain data of a second preset length and make the data as the filled character;

in which the third preset byte is a twenty-seventh byte of the plaintext in the second instruction, the second preset length is 2 bytes.

Step 111, determine whether the filled character is legitimate, if yes, execute Step 112; if no, determine the system working mode, send a second error response to the upper computer via the apple interface and return to Step 101 in a case that the system working mode is apple mode; send the second error response to the upper computer via the USB interface and return to Step 101 in a case that the system working mode is USB mode;

In Embodiment 1, determine whether the filled character is legitimate according to a value of the filled character; specifically, the filled character is legitimate in a case that the value equals a sixth preset value; otherwise, the filled character is not legitimate; wherein the sixth preset value is 0xFFFF;

Step 112, an appointed part of the plaintext in the second instruction is calculated to get a verification result;

In Embodiment 1, the appointed part of the plaintext in the second instruction specifically is all part of the plaintext in the second instruction except the check code, which includes a KSN plaintext, an IPEK plaintext and the filled character in the plaintext in the second instruction;

Specifically, starting from the first preset byte of the plaintext in the second instruction, the card reader obtains data of a third preset length, and calculates the data to get a calculated result as a verification result. Wherein, the third preset length is 28 bytes.

Step 113, obtain the check code from the plaintext in the second instruction, determine whether the verification result is identical to the check code, if yes, execute Step 114; if no, determine the system working mode, send a third error response to the upper computer via the apple interface and return to Step 101 in a case that the system working mode is apple mode; send the third error response to the upper computer via the USB interface and return to Step 101 in a case that the system working mode is USB mode;

In Embodiment 1, starting from a fourth preset byte of the plaintext in the second instruction, obtain data of a fourth preset length, and make the data as the check code; wherein the fourth preset byte is the twenty-ninth byte of the plaintext in the second instruction, the fourth preset length is 4 bytes.

Step 114, KSN plaintext and an IPEK plaintext are obtained from the plaintext in the second instruction, and the KSN plaintext and the IPEK plaintext are configured to replace the KSN and the IPEK in flash respectively;

Specifically, starting from the first preset byte of the plaintext in the second instruction, obtain data of a fifth preset length and make the data as the IPEK; starting from the fifth preset byte in the plaintext in the second instruction, obtain data of a sixth preset length and make the data as the KSN. Wherein, the fifth preset byte is a seventh byte of the plaintext in the second instruction, the fifth preset length is 16 bytes, the sixth preset length is 10 bytes.

Step 115, determine the system working mode, send a write-the-KSN-and-the-IPEK-in response to the upper computer via the apple interface and return to Step 101 if the system working mode is apple mode; send a write-the-KSN-and-the-IPEK-in response to the upper computer via the USB interface and return to Step 101 if the system working mode is USB mode;

When the third instruction is received by the card reader, execute Step 116 and Step 117 to realize that the KSN in the card reader is returned to the upper computer;

Step 116, the KSN is obtained from flash;

Step 117, determine the system working mode, send a KSN response to the upper computer via the apple interface and return to Step 101 if the system working mode is apple mode; send the KSN response to the upper computer via the USB interface and return to Step 101 if the system working mode is USB mode;

In Embodiment 1, the KSN response includes a KSN and a KSN state character. In a case that the KSN state character is 0x9000, the KSN is obtained successfully; the KSN is failed to be obtained in a case that the KSN state character is other value.

When a value of the first byte of the instruction received by the card reader is the second preset value, execute Steps from Step 118 to Step 126 to realize that the instruction sent by the upper computer is decrypted by the card reader and the decrypted instruction is sent to the card; the data returned by the card is encrypted by the card reader, the decrypted data is sent to the upper computer;

Step 118, determine whether the decryption flag is set, if yes, execute Step 119; if no, execute Step 125;

In Embodiment 1, that the decryption flag is set means that enable decryption, that is, the received instruction is required to be decrypted, wherein the received instruction is consisted of a ciphtertext; that the decryption flag is not set means that disable decryption, that is, the received instruction is not required to be decrypted, wherein the received instruction is consisted of a plaintext;

Step 119, determine the decryption way, execute Step 120 if the decryption way is bi-directional decryption; send the instruction to the card and execute Step 122 if the decryption way is unidirectional decryption;

Step 120, the IPEK and the KSN in flash is obtained, a decryption key is obtained by calculating according to the IPEK and the KSN; execute Step 121;

In Embodiment 1, the last 21 bits of the KSN is a counter value, an initial value of the counter value is 0. Updating the KSN according to the preset way specifically is that the KSN is obtained from flash, the counter value is obtained from the KSN; a result, gotten by that the counter value plus 1, is configured to replace the counter value, and other parts of the KSN do not change, the obtained KSN is configured to update the KSN.

Step 121, the algorithm corresponding to the algorithm flag is obtained according to the algorithm flag, the algorithm and the decryption key are configured to decrypt the ciphertext in the instruction to obtain a decrypted instruction, the decrypted instruction is sent to the card; execute Step 122;

Step 122, wait for receiving data returned by the card;

Step 123, when the data returned by the card is received, the algorithm corresponding to the algorithm flag is configured to be a current algorithm, the KSN is updated according to the preset way, the updated KSN is configured to replace the KSN in flash;

Step 124, in accordance with the IPEK, the updated KSN and the current algorithm, the data returned by the card is encrypted to get the ciphertext of the data returned by the card, determine the system working mode, send the ciphertext of the data to the upper computer via the apple interface and return to Step 101 if the system working mode is apple mode; send the ciphertext of the data to the upper computer via the USB interface and return to Step 101 if the system working mode is USB mode;

Specifically, the data of card is transcoded as ASCII code (American Standard Code for Information Interchange) data, data of the last byte of the ASCII code data is deleted to obtain a length of the ASCII code data of which the last byte of data is deleted and the length is made as the first length, the first data is configured to perform modular operation on the first length to get a result and the result is made as the second length; starting from low order end of the ASCII code data of which the last byte of data is deleted, the second data of the second length is configured to cover the position to get data of integral multiple of length of 8 bytes, and the data is encrypted to get the ciphertext, and the ciphertext is sent to the upper computer;

Preferably, the first data is 8, the second data is 0xFF, the low order end is the right end.

Step 125, the received instruction is sent to the card; wait for receiving data returned by the card;

Step 126, when the data returned by the card is received by the card reader, determine the system working mode, send the data returned by the card to the upper computer via the apple interface and return to Step 101 if the system working mode is apple mode; send the data returned by the card to the upper computer via the USB interface and return to Step 101 if the system working mode is USB mode.

Embodiment 2

Figures 1, 3:
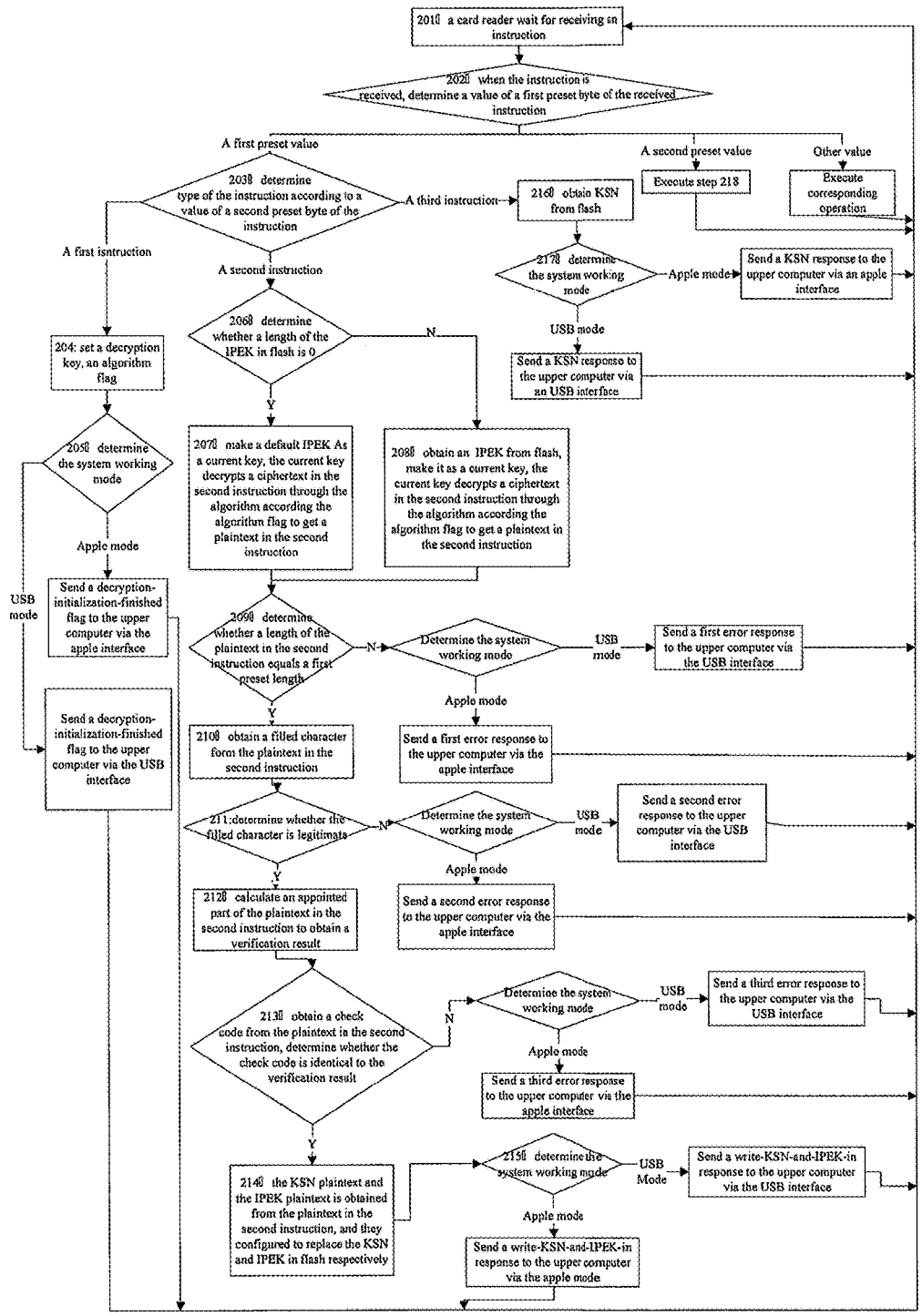
Figures 2, 3:
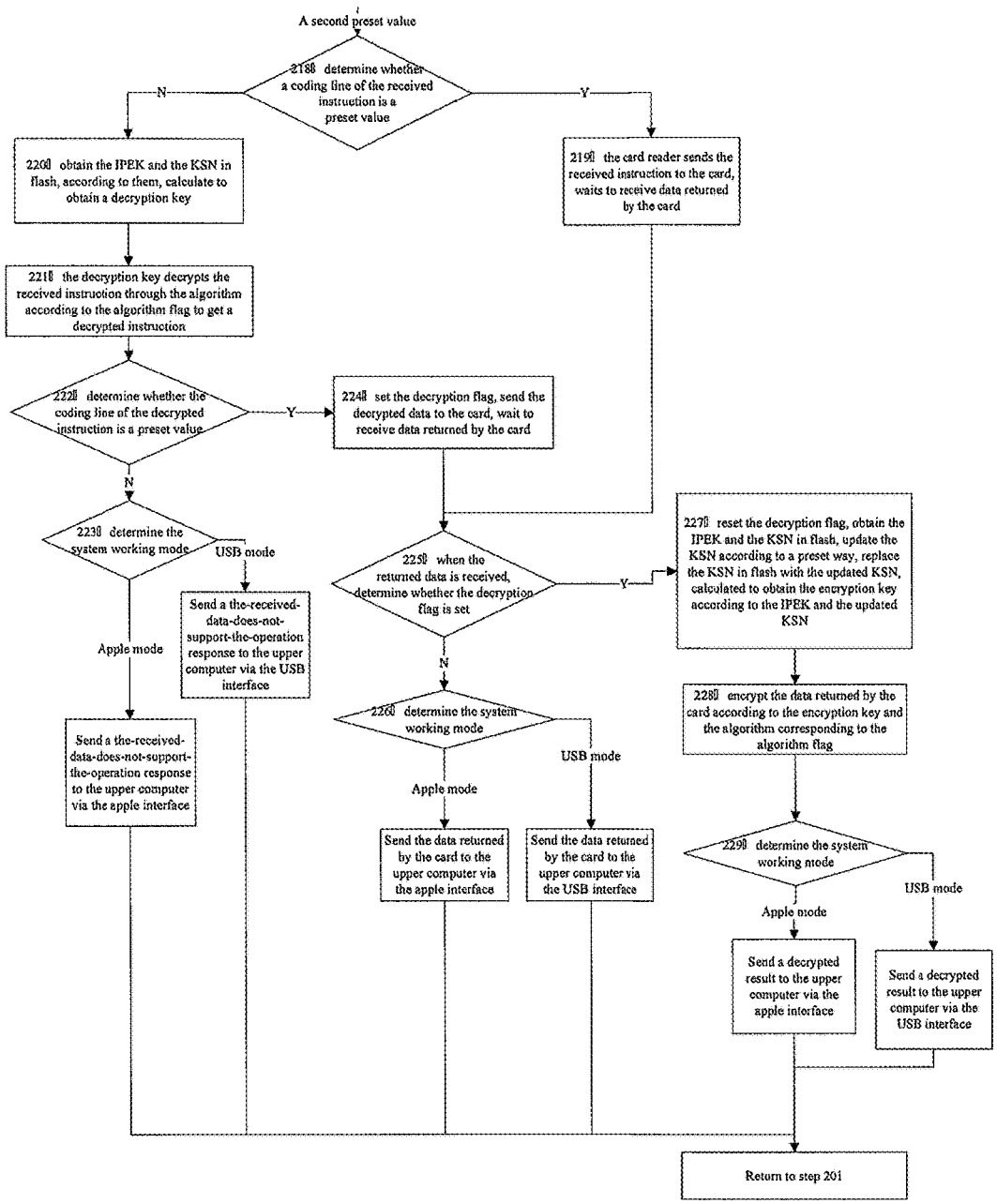

Embodiment 2 of the present invention provides a method for a card reader to process data, wherein, the data could be received via a USB interface or via an apple interface, as shown in FIG. 3-1 and FIG. 3-2, the method includes:

Step 201, an instruction is received by a card reader;

In Embodiment 2, the instruction is received by the card reader via a USB interface or via an apple interface.

Step 202, when the instruction is received, determine a value of a first preset byte of the received instruction; execute steps from Step 203 to Step 217 in a case that the value is a first preset value; execute steps from Step 218 to Step 229 in a case that the value is a second preset value; execute corresponding operation and return to Step 201 in a case that the value is other value;

In Embodiment 2, preferably, the first preset byte is the first byte of the instruction, the first preset value is 0x6B, the second preset value is 0x6F.

Step 203, determine a type of instruction according to a second preset byte of the instruction, execute Step 204 if the instruction is a first instruction; execute Step 206 if the instruction is a second instruction; execute Step 216 if the instruction is a third instruction;

In Embodiment 2, if the value of the second preset bytes is a third preset value, the instruction is the first instruction;

If the value of the second preset bytes is a fourth preset value, the instruction is the second instruction;

in which the second instruction includes an instruction header and a cipher text, the cipher text is consist of a KSN, an IPEK, a filled character and a check code;

If the value of the second preset bytes is a fifth preset value, the instruction is the third instruction;

Preferably, the second preset bytes are bytes from an eleventh byte to a twelfth byte of the instruction, the third preset value is 0x5B01, the fourth preset value is 0x5B02, and the fifth preset value is 0x5B03.

When the first instruction is received, execute steps from Step 204 to Step 205 to realize that a decryption flag and an algorithm flag in the card reader are set by the card reader;

Step 204, the decryption flag and the algorithm flag are set;

In Embodiment 2, the decryption flag and the algorithm flag in the card reader are set by the reader. The decryption flag is set as resetting or setting, wherein resetting the decryption flag is disabling decryption, setting the decryption flag is enabling decryption; the algorithm flag includes a first algorithm flag and a second algorithm flag, preferably, the first algorithm flag is corresponding to 3DES algorithm, and the second algorithm flag is corresponding to AES algorithm; preferably, when the card reader is initialized, the decryption flag is set as resetting and the algorithm flag is set the first algorithm flag.

Specifically, the decryption flag is set according to the first instruction, the algorithm flag is set as the first algorithm flag or the second algorithm flag.

Step 205, determine a system working mode, send a decryption-initialization-finished response to an upper computer via the apple interface and return to Step 201 if the system working mode is apple mode; send the decryption-initialization-finished response to the upper computer via the USB interface and return to Step 201 if the system working mode is USB mode;

In Embodiment 2, the decryption-initialization-finished response includes a decrypt-initialization-state-character, when the decrypt-initialization-state-character is 0x9000, the decryption flag and the algorithm flag are successfully set; when the decrypt-initialization-state-character is other value, the decryption flag and the algorithm flag are not successfully set.

When the second instruction is received by the card reader, execute Steps from Step 206 to Step 215 to realize that the KSN and the IPKE in the card reader are set by the reader;

Step 206, determine whether a length of the IPEK in flash is 0, if yes, execute Step 207; if no, execute Step 208;

Step 207, a default IPEK is made as a current key, the current key is configured to decrypt the ciphertext in the second instruction through the algorithm corresponding to the algorithm flag to get a plaintext in the second instruction; execute Step 209;

In Embodiment 2, the length of the default IPEK is 16 bytes;

Step 208, the IPEK in flash is obtained and made as a current key, the current key is configured to decrypt the ciphertext in the second instruction through the algorithm corresponding to the algorithm flag to get the plaintext in the second instruction; execute Step 209;

Preferably, the plaintext in the second instruction comprises an IPEK, a KSN, a filled character and a check code, wherein the length of the IPEK is 16 bytes, a length of the KSN is 10 bytes, a length of the filled character is 2 bytes and a length of the check code is 4 bytes;

Step 209, determine whether a length of the plaintext in the second instruction equals a first preset length, if yes, execute Step 210; otherwise, determine the system working mode, send a first error response to the upper computer via the apple interface and return to Step 201 if the system working mode is apple mode; send the first error response to the upper computer via the USB interface and return to Step 201 if the system working mode is USB mode;

In Embodiment 2, the first preset length is 32 bytes, the first error response is 0X6700;

Step 210, the filled character is obtained from the plaintext in the second instruction;

In Embodiment 2, starting from a third preset byte of the plaintext in the second instruction, obtain data of the second preset length, and make the data as the filled character;

in which the third preset byte is the twenty-seventh byte of the plaintext in the second instruction, the second preset length is 2 bytes.

Step 211, determine whether the filled character is legitimate, if yes, execute Step 212; otherwise, determine the system working mode, send a second error response to the upper computer via the apple interface and return to Step 201 if the system working mode is apple mode; send a second error response to the upper computer via the USB interface and return to Step 201 if the system working mode is USB mode;

In Embodiment 2, determining whether the filled character is legitimate according to a value of the filled character specifically comprises that the filled character is legitimate if the value of it is a sixth preset value; the filled character is not legitimate if the value is not the sixth preset value; wherein the sixth preset value is 0xFFFF;

Step 212, an appointed part of the plaintext in the second instruction is calculated to obtain a verification result;

In Embodiment 2, the appointed part of the plaintext in the second instruction is specifically all parts of the plaintext in the second instruction except the check code, which comprises a KSN plaintext, an IPEK plaintext and the filled character of the plaintext in the second instruction;

Specifically, starting from the first preset byte of the plaintext in the second instruction, the card reader obtain data of the third preset length, the data obtained is calculated to get a result to be the verification result. Wherein, the third preset length is 28 bytes.

Step 213, obtain the check code from the plaintext in the second instruction, determine whether the verification result is identical to the check code, if yes, execute Step 214; otherwise, determine the system working mode, send a third error response to the upper computer via the apple interface and return to Step 201 if the system working mode is apple mode; send the third error response to the upper computer via the USB interface and return to Step 201 if the system working mode is USB mode;

In Embodiment 2, starting from a fourth preset byte of the plaintext in the second instruction, obtain data of a fourth preset length to be the check code; wherein the fourth preset byte is the twenty-ninth byte of the plaintext in the second instruction, the fourth preset length is 4 bytes.

Step 214, the KSN plaintext and the IPEK plaintext is obtained from the plaintext in the second instruction, and they configured to replace the KSN and IPEK in flash respectively; execute Step 215;

Specifically, starting from the first preset byte of the plaintext in the second instruction, the card reader obtains data of a fifth preset length to be the IPEK; starting from a fifth preset byte of the plaintext in the second instruction, the card reader obtains data of a sixth preset length to be the KSN. Wherein, the fifth preset byte is a seventh byte, the fifth preset length is 16 bytes, the sixth preset length is 10 bytes.

Step 215, determine the system working mode, send a write-KNS-and-IPEK-in response to the upper computer via the apple interface and return to Step 201 if the system working mode is apple mode; send the write-KNS-and-IPEK-in response to the upper computer via the USB interface and return to Step 201 if the system working mode is USB mode;

When the third instruction is received by the card reader, execute Steps from Step 216 to Step 217 to realize that the KSN in the card reader is returned to the upper computer;

Step 216, the KSN is obtained from flash;

Step 217, a KSN response is sent to the upper computer; return to Step 201;

In Embodiment 2, format of the KSN response includes a KSN and a KSN state character. The KSN state character is 0x9000 which means the KSN is obtained successfully; the KSN is failed to be obtained in a case that the KSN state character is other value.

When a value of the first byte of the instruction received by the card reader is the second preset value, execute Steps from Step 218 to Step 219 to realize that the instruction sent by the upper computer is decrypted by the card reader, and the decrypted instruction is sent to the card; the data returned by the card is encrypted by the card reader, and the encrypted data is sent to the upper computer;

Step 218, determine whether a coding line of the received instruction is a preset value, if yes, execute Step 219; if no, execute Step 220;

Step 219, the received instruction is sent to the card by the card reader, the card reader waits for receiving data returned by the card, execute Step 225;

Step 220, obtain the IPEK and the KSN in flash, a decryption key is obtained by calculating the IPKE and the KSN; execute Step 221;

Step 221, in accordance with the algorithm corresponding to the algorithm flag and the decryption key, the received instruction is decrypted to get a decrypted instruction;

Step 222, determine whether the coding line of the decrypted instruction is a preset value, if yes, execute Step 224; if no, execute Step 223;

Step 223, determine the system working mode, send a received-data-does-not-support-the-operation response to the upper computer via the apple interface and return to Step 201 if the system working mode is apple mode; send the received-data-does-not-support-the-operation response to the upper computer via the USB interface and return to Step 201 if the system working mode is USB mode;

Step 224, the decryption flag is set, the decrypted data is sent to the card, the card reader waits to receive returned data; executes Step 225;

Step 225, when the data returned by the card is received, determine whether the decryption flag is set, if yes, execute Step 227; if no, execute Step 226;

Step 226, determine the system working mode, send data returned by the card to the upper computer via the apple interface and return to Step 201 if the system working mode is apple mode; send the data returned by the card to the upper computer via the USB interface and return to Step 201 if the system working mode is USB mode;

Step 227, the decryption flag is set, the IPKE and the KSN in flash is obtained, the KSN is updated in a preset way, the updated KSN replaces the KSN in flash, the IPEK and the updated KSN are calculated to obtain the encryption key; execute Step 228;

Step 228, the data returned by the card is encrypted according to the encryption key and the algorithm corresponding to the algorithm flag to get an encrypted result;

Step 229, determine the system working mode, send the encrypted result to the upper computer via the apple interface and return to Step 201 if the system working mode is apple mode; send the encrypted result to the upper computer via the USB interface and return to Step 201 if the system working mode is USB mode.

Embodiment 3

Figures 1, 4:
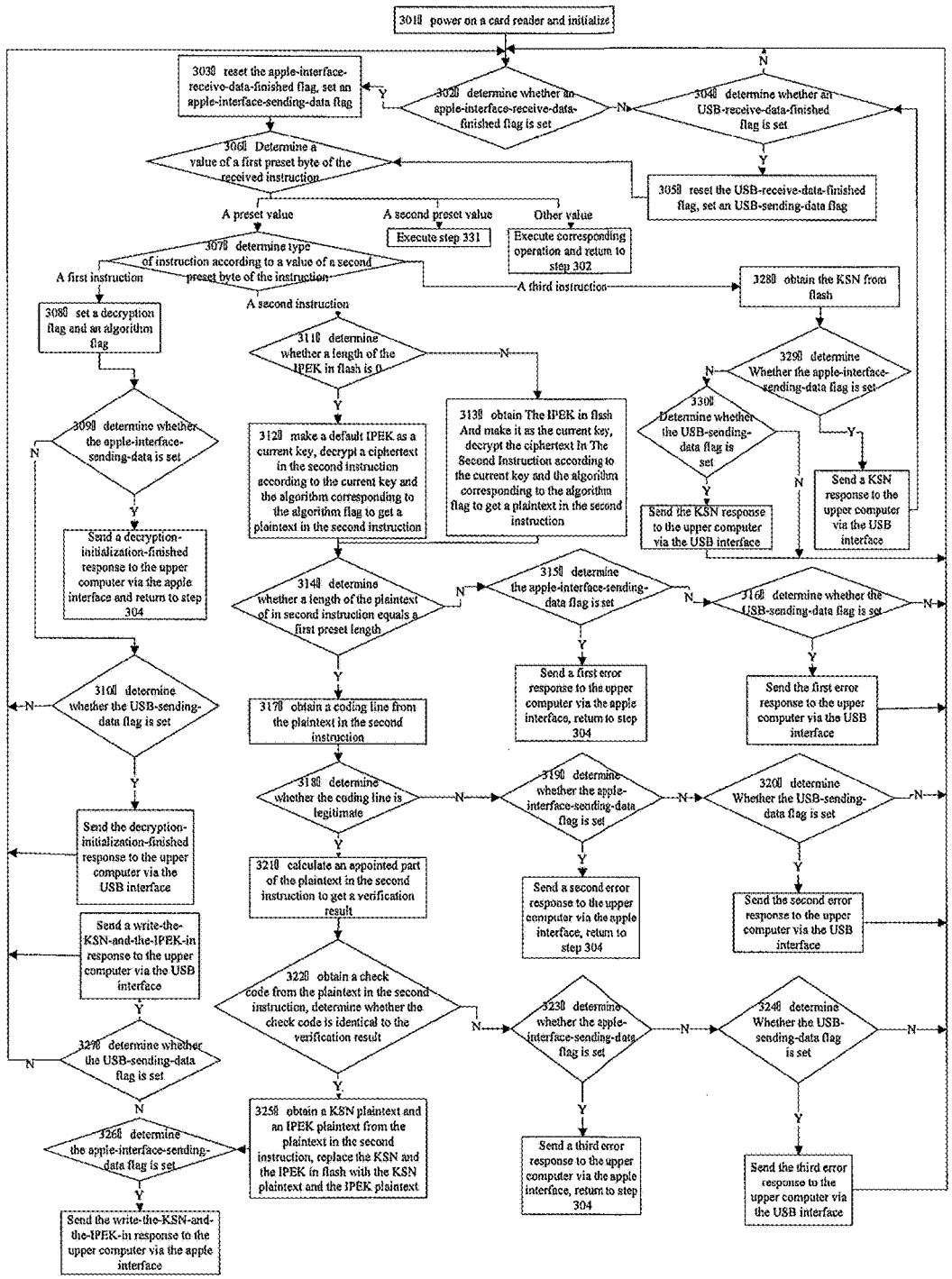
Figures 2, 4:
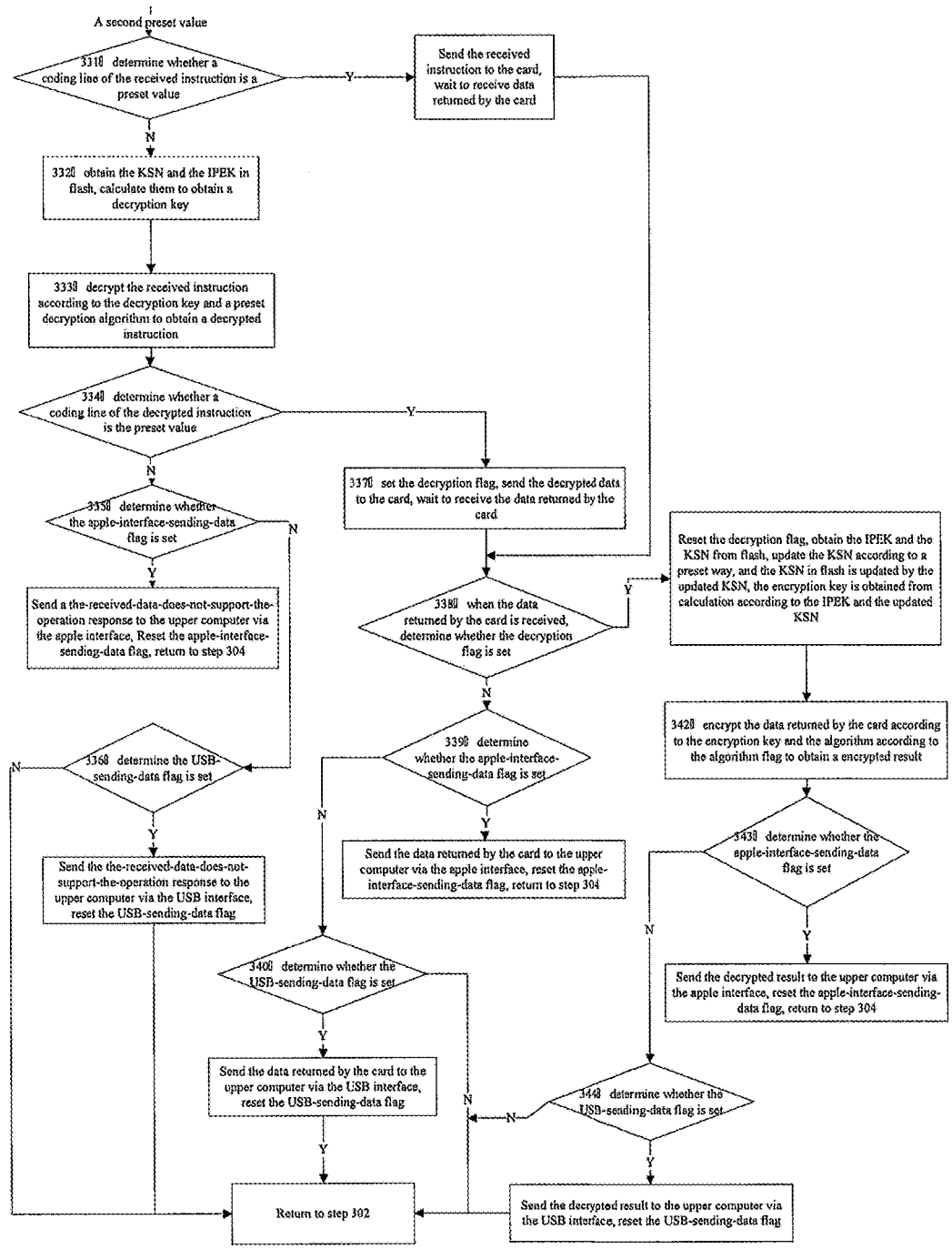

In Embodiment 3, a method for processing USB data is identical to a method for processing apple data, as shown in FIG. 4-1 and FIG. 4-2, the method comprises:

Step 301, a card reader is powered on and initialized;

In Embodiment 3, a decryption flag and an algorithm flag in the card reader are set by the reader. Wherein, the decryption flag is set as resetting or setting, resetting the decryption flag means disabling decryption, setting the decryption flag means enabling decryption; the algorithm flag comprises a first algorithm flag and a second algorithm flag, preferably, the first algorithm flag is corresponding to 3DES algorithm, the second algorithm flag is corresponding to AES algorithm;

Preferably, when the card reader is powered on and initialized, the decryption flag is reset, the algorithm flag is set as the first algorithm flag.

Figure 5:
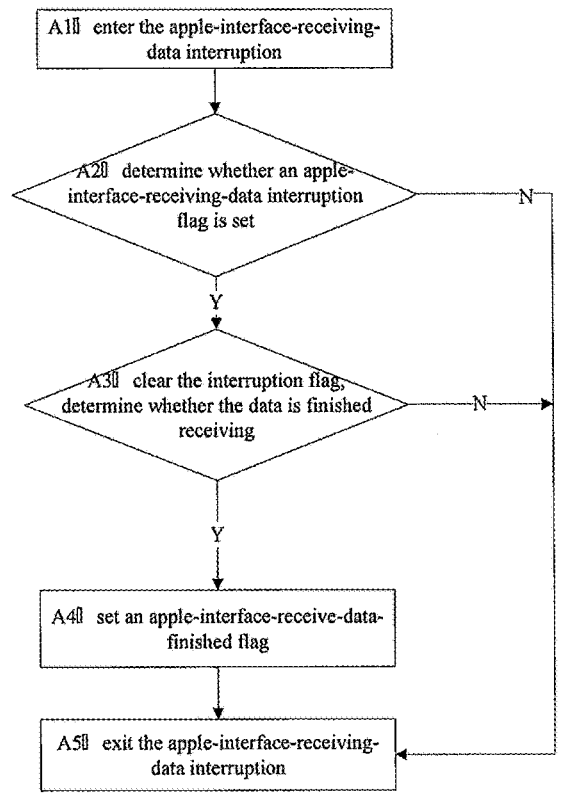
FIG. 5 is a flowchart of a method for Apple interface receiving data interruption according to the present invention.
Figure 6:
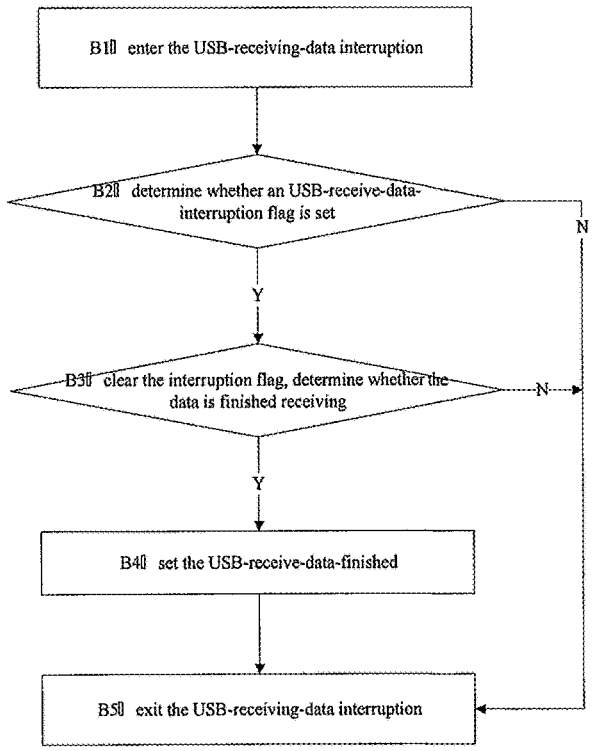
FIG. 6 is a flowchart of a method for USB receiving data interruption according to the present invention.

When the card reader is powered on and initialized, the method further includes:

Turn on an interruption, the interruption includes an apple-interface-receiving-data interruption and a USB-receiving-data interruption; when data is received by the card reader via an apple interface, turn on the interruption to enter the apple-interface-receiving-data interruption process; when the data is received by the card reader via a USB interface, turn on the interruption to enter the USB-receiving-data interruption process;

A method for the apple-interface-receiving-data interruption process, as shown in FIG. 5, comprises:

Step A1, enter the apple-interface-receiving-data interruption;

Step A2, determine whether an apple-interface-receiving-data interruption flag is set, if yes, execute Step A3; if no, execute Step A5;

Step A3, clear the interruption flag, determine whether the data is finished receiving, if yes, execute Step A4; if no, execute Step A5;

Step A4, an apple-interface-receive-data-finished flag is set;

Step A5, exit the apple-interface-receiving-data interruption;

As shown in FIG. 6, a processing method for the USB-receiving-data interruption, comprises:

Step B1, enter the USB-receiving-data interruption;

Step B2, determine whether a USB-receive-data-interruption flag is set, if yes, execute Step B3; if no, execute Step B5;

Step B3, clear the interruption flag, determine whether the data is finished receiving, if yes, execute Step B4; if no, execute Step B5;

Step B4, the USB-receive-data-finished is set;

Step B5, exit the USB-receiving-data interruption.

Step 302, determine whether the apple-interface-receive-data-finished flag is set, if yes, execute Step 303; if no, execute Step 304;

Step 303, the apple-interface-receiving-data-finished flag is reset, an apple-interface-sending-data is set; execute Step 306;

Step 304, determine whether the USB-receive-data-finished flag is set, if yes, execute Step 305; if no, return to Step 302;

Step 305, the USB-receive-data-finished flag is reset, a USB-sending-data flag is set; execute Step 306;

Step 306, determine a value of a first preset byte of the received instruction, execute Step 307 if the value is a first preset value; execute Step 331 if the value is a second preset value; execute corresponding operation and return to Step 302 if the value is other value;

Step 307, determine a type of the instruction according to a value of a second preset byte of the instruction, execute Step 308 if the instruction is a first instruction; execute Step 311 if the instruction is a second instruction; execute Step 328 if the instruction is a third instruction;

In Embodiment 3, if the value of the second preset bytes of the instruction equals a third preset value, the instruction is the first instruction;

If the value of the second preset bytes of the instruction equals a fourth preset value, the instruction is the second instruction;

in which the second instruction comprises an instruction header and a ciphertext, the ciphertext is consist of a KSN (Key Serial Number), an IPEK (Initial Pin Encryption), a filled character and a check code;

If the value of the second preset bytes of the instruction equals a fifth preset value, the instruction is the third instruction;

Preferably, the second preset bytes are bytes from an eleventh byte to a twelfth byte of the instruction, the third preset value is 0x5B01, the fourth preset value is 0x5B02, the fifth preset value is 0x5B03.

When the first instruction is received, execute Steps from Step 308 to Step 310 to realize that a decryption flag and an algorithm flag in the card reader are set by the reader;

Step 308, the decryption flag and the algorithm flag are set;

In Embodiment 3, the decryption flag is set according to the first instruction, the algorithm flag is set as a first algorithm flag or a second algorithm flag.

Step 309, determine whether the apple-interface-sending-data flag is set, if yes, send a decryption-initialization-finished response to the upper computer via the apple interface and return to Step 304; if no, execute Step 310;

In this Embodiment, the decryption-initialization-finished response includes a decryption-initialization-state-character, the decryption-flag and the algorithm flag are successfully set if the decryption-initialization-state-character is 0x9000; the decryption flag and the algorithm flag are not successfully set if the decryption-initialization-state-character is other value.

Step 310, determine whether the USB-sending-data flag is set, if yes, send the decryption-initialization-finished response to the upper computer via the USB interface and return to Step 302; if no, return to Step 302;

When the second instruction is received by the card reader, execute Steps from Step 311 to Step 327 to realize that the KSN and the IPEK inside the card reader are set by the card reader;

Step 311, determine whether a length of the IPEK in flash is 0, if yes, execute Step 312; if no, execute Step 313;

Step 312, a default IPEK is made as a current key, the ciphertext in the second instruction is decrypted by the current key through an algorithm according to the algorithm flag to get a plaintext in the second instruction; execute Step 314;

In Embodiment 3, the length of the default IPEK is 16 bytes;

Step 313, obtain the IPEK in flash and make it as a current key, the ciphertext of the second instruction is decrypted by the current key through the algorithm corresponding to the algorithm flag to get a plaintext in the second instruction; execute Step 314;

Preferably, the plaintext in the second instruction includes an IPEK, a KSN, a filled character and a check code, wherein the length of the IPEK is 16 bytes, a length of the KSN is 10 bytes, a length of the filled character is 2 bytes, a length of the check code is 4 bytes;

Step 314, determine whether a length of the plaintext equals a first preset length, if yes, execute Step 317; if no, execute Step 315;

Step 315, determine whether the apple-interface-sending-data flag is set, if yes, send a first error response to the upper computer via the apple interface, and return to Step 304; if no, return to Step 316;

In Embodiment 3, the first preset length is 32 bytes, the first error response is 0X6700;

Step 316, determine whether the USB-sending-data flag is set, if yes, send the first error response to the upper computer via the USB interface and return to Step 302; if no, return to Step 302;

Step 317, the filled character is obtained from the plaintext in the second instruction; execute Step 318;

In Embodiment 3, starting from a third preset byte of the plaintext in the second instruction, the card reader obtains data of a second preset length and makes the data as the filled character;

in which the third preset byte is a twenty-seventh byte of the plaintext in the second instruction, the second preset length is 2 bytes.

Step 318, determine whether the filled character is legitimate, if yes, execute Step 321; if no, execute Step 319;

Step 319, determine whether the apple-interface-sending-data flag is set, if yes, send a second error response to the upper computer via the apple interface and return to Step 304; if no, execute Step 320;

In this Embodiment 3, determining whether the filled character is legitimate according to a value of the filled character specifically comprises that the filled character is legitimate if the value equals a sixth preset value; the filled character is not legitimate if the value does not equal the sixth preset value; wherein, the sixth preset value is 0xFFFF;

Step 320, determine whether the USB-sending-data flag is set, if yes, send the second error response to the upper computer via the USB interface and return to Step 302; if no, return to Step 302;

Step 321, an appointed part of the plaintext of the plaintext in the second instruction is calculated to obtain a verification result; execute Step 322;

In Embodiment 3, the appointed part of the plaintext in the second instruction specifically is all parts of the plaintext in the second instruction except the check code, which is a KSN plaintext, an IPEK plaintext and the filled character of the plaintext in the second instruction;

Specifically, starting from the first preset byte of the plaintext in the second instruction, the card reader obtains data of a third preset length, and calculates the data to make the calculated result to be a verification result. Wherein, the third preset length is 28 bytes.

Step 322, a check code is obtained from the plaintext in the second instruction, determine whether the verification result is identical to the check code, if yes, execute Step 325; if no, execute Step 323;

In Embodiment 3, starting from a fourth preset byte of the plaintext in the second instruction, obtain data of a fourth preset length and make the data as the check code; wherein, the fourth preset byte is a twenty-ninth byte of the plaintext in the second instruction, the fourth preset length is 4 bytes.

Step 323, determine whether the apple-interface-sending-data flag is set, if yes, send a third error response to the upper computer via the apple interface and return to Step 304; otherwise, return to Step 324;

Step 324, determine whether the USB-sending-data flag is set, if yes, send a third error response to the upper computer via the USB interface and return to Step 302; otherwise, directly return to Step 302;

Step 325, the KSN plaintext and the IPEK plaintext are obtained from the plaintext in the second instruction, the KSN plaintext and the IPEK plaintext are configured to replace the KSN and the IPEK in flash; execute Step 326;

Specifically, starting from the first preset byte of the plaintext in the second instruction, obtain data of a fifth preset length and make the data as the IPEK; starting from a fifth preset byte of the plaintext in the second instruction, obtain data of a sixth preset length and make the data as the KSN. Wherein, the fifth preset byte is the seventeenth byte of the plaintext in the second instruction, the fifth preset length is 16 bytes, the sixth preset length is 10 bytes.

Step 326, determine whether the apple-interface-sending-data flag is set, if yes, send a write-KSN-and-IPEK-in response to the upper computer via the apple interface and return to Step 304; if no, execute Step 327;

Step 327, determine whether the USB-sending-data flag is set, if yes, send the write-KSN-and-IPEK-in response to the upper computer via the USB interface and return to Step 302; if no, return to Step 302;

When the third instruction is received by the card reader, execute steps from Step 328 to Step 330 to realize that the KSN inside the card reader is returned to the upper computer;

Step 328, the KSN is obtained from flash;

Step 329, determine whether the apple-interface-sending-data flag is set, if yes, send a KSN response to the upper computer via the apple interface, and return to Step 304; if no, execute Step 330;

In Embodiment 3, the KSN response includes the KSN and an obtained KSN state character. The KSN is successfully obtained in a case that the KSN state character is 0x9000; the KSN is not successfully obtained in a case that the KSN state character is other value.

Step 330, determine whether the USB-sending-data flag is set, if yes, send the KSN response to the upper computer via the USB interface and return to Step 302; if no, return to Step 302;

When a value of a first byte of an instruction received by the card reader is the second preset value, execute steps from Step 331 to Step 344 to realize that the instruction sent by the upper computer is decrypted by the card reader, and the decrypted instruction is sent to the card reader; the data returned by the card is encrypted by the card reader, and the decrypted data is sent to the upper computer;

Step 331, determine whether a coding line of the received instruction is a preset value, if yes, send the received instruction to the card and wait for receiving the data returned by the card, execute Step 338; if no, execute Step 332;

Step 332, the IPEK and the KSN are obtained from flash, according to the IPEK and the KSN, an decryption key is obtained from calculation; execute Step 333;

Step 333, the received instruction is decrypted by the decryption key through a preset decryption algorithm to get a decrypted instruction;

Step 334, determine whether a coding line of the decrypted instruction is the preset value, if yes, execute Step 337; if no, execute Step 335;

Step 335, determine whether the apple-interface-sending-data flag is set, if yes, send a the-received-data-does-not-support-the-operation response to the upper computer via the apple interface, the apple-interface-sending-data flag is reset, return to Step 304; if no, execute Step 336;

Step 336, determine whether the USB-sending-data flag is set, if yes, send the the-received-data-does-not-support-the-operation response to the upper computer via the USB interface, the USB-sending-data flag is reset, return to Step 302; if no, return to Step 302;

Step 337, the decryption flag is set, the decrypted data is sent to the card; wait for receiving data returned by the card, execute Step 338;

Step 338, when the data returned by the card is received, determine whether the decryption flag is set, if yes, execute Step 341; if no, execute Step 339;

Step 339, determine whether the apple-interface-sending-data flag is set, if yes, send the data returned by the card to the upper computer via the apple interface, the apple-interface-sending-data flag is reset, return to Step 304; if no, execute Step 340;

Step 340, determine whether the USB-sending-data flag is set, if yes, send the data returned by the card to the upper computer via the USB interface, the USB-sending-data flag is reset, return to Step 302; if no, execute Step 302;

Step 341, the decryption flag is reset, the IPEK and the KSN are obtained from flash, the KSN is updated according to a preset way, and the KSN in flash is updated by the updated KSN, the encryption key is obtained from calculation according to the IPEK and the updated KSN; execute Step 342;

Step 342, the data returned by the card is encrypted by the encryption key through the algorithm corresponding to the algorithm flag to obtain an encrypted result; execute Step 343;

Step 343, determine whether the apple-interface-sending-data flag is set, if yes, send the encrypted result to the upper computer via the apple interface, reset the apple-interface-sending-data flag, return to Step 304; if no, execute Step 344;

Step 344, determine whether the USB-sending-data flag is set, if yes, send the encrypted result to the upper computer via the USB interface, reset the USB-sending-data flag, return to Step 302; if no, return to Step 302.

It needs to be illustrated that Step 218 to Step 230 in Embodiment 2 could be replaced with Step 405 to Step 415;

Step 405, determine whether a coding line of the received instruction is a preset value, if yes, the instruction is sent to the card, execute Step 410; if no, execute Step 406;

Step 406, the received instruction is decrypted by the decryption key through a preset decryption algorithm to obtain a decrypted instruction; execute Step 407;

Step 407, determine whether a coding line of the decrypted instruction is the preset value, if yes, execute Step 409; if no, execute Step 408;

Step 408, determine the system working mode, send a the-received-data-does-not-support-the-operation response to the upper computer via the apple interface, and return to Step 201 in a case that the system working mode is apple mode; send the the-received-data-does-not-support-the-operation response to the upper computer via the USB interface and return to Step 201 in a case that the system working mode is USB mode;

Step 409, the encryption flag is set, the decrypted instruction is sent to the card; execute Step 410;

Step 410, wait for receiving data returned by the card;

Step 411, when the data returned by the card is received by the card reader, determine whether the encryption flag is set, if yes, execute Step 413; if no, execute Step 412;

Step 412, determine the system working mode, send the data returned by the card to the upper computer via the apple interface, return to Step 201 in a case that the system working mode is apple mode; send the data returned by the card to the upper computer via the USB interface, return to Step 201 in a case that the system working mode is USB mode;

Step 413, the encryption flag is reset, the IPEK and the KSN are obtained from flash, the KSN is updated according to a preset way, the KSN in flash is replaced with the updated KSN, the IPEK and the updated KSN are calculated to obtain an encryption key;

Step 414, the data returned by the card is encrypted by the encryption key through the preset algorithm to get an encrypted result; execute Step 415;

Step 415, determine the system working mode, send the encrypted result to the upper computer via the apple interface and return to Step 201 in a case that the system working mode is apple mode; send the encrypted result to the upper computer via the USB interface and return to Step 201 in a case that the system working mode is USB mode.

The embodiments above could also realize the object of the present invention.

While the preferred embodiments of the present invention have been shown and described herein, it will be obvious for those skilled in the art that such embodiments are provided by way of examples only. Any changes and substitutions will be covered by the scope of protection of the present invention. It is intended that the following claims define the scope of protection of the present the invention.

The invention claimed is:

1. A method for realizing secure communication, said method comprises the steps of:
   Step S1, powering on a card reader and initializing, the initializing includes setting a decryption flag, initializing an algorithm flag and setting a decryption way as a uni-directional decryption or a bi-directional decryption;
   Step S2, determining a system working mode, executing Step S3 where the system working mode is apple mode; while executing Step S4 where the system working mode is a USB mode;
   Step S3, performing an apple device certification, determining whether the apple device certification is successfully performed, if yes, executing Step S4, otherwise, returning to Step S2;
   Step S4, waiting, by the card reader, for receiving an instruction, when the instruction is received, determining a first preset byte of the instruction, executing Step S5 if the instruction is a first preset value; executing Step S6 if the instruction is a second preset value; executing corresponding operation and returning to Step S4 if the instruction is another value;
   Step S5, determining a type of the instruction according to a second preset byte of the instruction, if the instruction is a first instruction, setting the decryption flag, the algorithm flag and the decryption way according to the first instruction, and sending a first response to an upper computer via a corresponding interface according to the system working mode, and returning to Step S4; if the instruction is a second instruction, updating an initialized encryption key and a key serial number in the card reader according to the second instruction, and sending a second response to the upper computer via a corresponding interface according to the system working mode, and returning to Step S4; if the instruction is a third instruction, obtaining the key serial number from the card reader, and sending a third response to the upper computer via a corresponding interface according to the system working mode, and returning to Step S4;

Step S6, determining whether the decryption flag is set, if yes, executing Step S7, otherwise, sending the instruction received to a card, and waiting for receiving data returned by the card, when the data is received by the card reader, sending the data to the upper computer via a corresponding interface according to the system working mode, and returning to Step S4;

Step S7, determining the decryption way, where the decryption way is the bi-directional decryption, obtaining an initial encryption key and the key serial number from the card reader, calculating to obtain a decryption key according to the initial encryption key and the key serial number, decrypting a cyptertext in the received instruction in accordance with an algorithm corresponding to the algorithm flag and the decryption key to obtain a decrypted instruction, sending the instruction decrypted to the card, and waiting for receiving data returned by the card, executing Step S8; where the decryption way is the unidirectional decryption, sending the instruction received to the card, waiting for receiving the data returned by the card, and executing Step S8; and Step S8, when the data returned by the card is received by the card reader, updating the key serial number according to a preset way, in which the algorithm corresponding to the algorithm flag, the initial encryption key and the key serial number are configured to encrypt the data returned by the card to obtain a ciphertext of the data returned; sending the ciphertext to the upper computer according to the system working mode via a corresponding interface, and returning to Step S4.

2. The method as claimed in claim 1, wherein, the key serial number comprises a count value of the key serial number; and updating the key serial number in accordance with the preset way specifically is that the count value of the key serial number is updated.

3. The method as claimed in claim 1, wherein, that the algorithm corresponding to the algorithm flag, the initial encryption-key and the key serial number are configured to encrypt the data returned by the card in Step S8 specifically comprises:

Step F1, transcoding, by the card reader, the data returned by the card to American standard code for information interchange data, obtaining a length of a data which is get by deleting the last byte of American national standard code for information interchange data, and making the length of the data as a first length;

Step F2, performing, by a first data, modular operation on the first length to obtain a result, making the result as a second length; and Step F3, starting from a low-order end of the data obtained by deleting the last byte of American standard code for information interchange data, the bit is filled by a second data of the second length to obtain a fill-bit data, in which the algorithm corresponding to the algorithm flag, the initial encryption key and the key serial number are configure to encrypt the fill-bit data.

4. The method as claimed in claim 1, wherein, initializing in Step S1 specifically is that the algorithm flag is initialized, and the decryption flag is set;

setting the decryption flag, the algorithm flag and the decryption way according to the first instruction in a case that the instruction is the first instruction in Step S5 specifically comprising: setting the decryption flag and the algorithm flag according to the first instruction if the instruction is the first instruction;

Step S6 to Step S8 may be replaced with Step S6' to Step S8', respectively:

Step S6', determining whether a coding line of the instruction received is a preset value, if yes, sending the instruction received to the card, waiting for receiving the data returned by the card, and executing Step S8', otherwise, obtaining the initial encryption key and the key serial number from the card reader, calculating decryption key according to the initialized encryption key and the key serial number, in which the algorithm corresponding to the algorithm flag and the decryption key are configured to decrypt the instruction received to get the decrypted result; then executing Step S7';

Step S7', determining whether an instruction word of the decrypted result is the preset value, if yes, setting the decryption flag, sending the decrypted result to the card, waiting for receiving the data returned by the card, and executing Step S8', otherwise, sending a response that the data received does not meet a condition of the operation to the upper computer according to the system working mode via a corresponding interface, returning to Step S2; and Step S8', when receiving, by the card reader, the data returned by the card, determining whether the decryption flag is set, if yes, resetting the decryption flag, obtaining the initial pin encryption and the key serial number from the card reader, updating the key serial number according to the preset way, calculating encryption key in accordance with the initial pin encryption and the key serial number, making the serial number as the key serial number updated in the card reader, encrypting the data returned by the card according to the encryption key and the algorithm corresponding to algorithm flag and the encryption key to get the encrypted result, sending the encrypted result to the upper computer according to the system working mode via a corresponding interface, and returning to Step S2.

5. The method as claimed in claim 1, wherein, initializing in Step S1 further comprises: turning on interruption, in which the interruption includes apple interface receiving data interruption and USB interface receiving data interruption, when receiving, by the card reader, data via an apple interface, entering apple interface receiving data interruption; in which the apple interface receiving data interruption comprises:

Step G1, determining whether an apple-interface-receiving-interruption flag is set, if yes, executing Step G2, otherwise, exiting apple interface receiving data interruption;

Step G2, clearing an interruption flag, determining whether data finish is received, if yes, setting an apple interface receiving data finish flag and exiting the apple interface receiving data interruption, otherwise, directly exiting the apple interface receiving data interruption;

when receiving, by the card reader, the data via a USB interface, entering USB receiving data interruption, in which the USB interface receiving data interruption specifically comprises:

Step H1, determining whether a USB receiving data interruption flag is set, if yes, executing Step H2, otherwise, exiting the USB receiving data interruption;

Step H2, clearing the interruption flag, determining whether the data finish is received, if yes, setting a USB receiving data finish flag and exiting the USB receiving data interruption, otherwise, directly exiting the USB receiving data interruption;

Step S2 to Step S4 may be replaced with Step S2' to Step S4', respectively:

Step S2', determining, by the card reader, whether an apple interface receiving data finish flag is set, if yes, resetting the apple interface receiving data finish flag, setting an apple interface sending data flag, and executing Step S4', otherwise, executing Step S3';

Step S3', determining whether the USB receiving data finish flag is set, if yes, resetting the USB receiving data finish flag, setting a USB sending data flag, and executing Step S4', otherwise, returning to Step S2';

Step S4', determining a first preset byte of the instruction received, executing Step S5 if the first preset byte is a first preset value; executing Step S6' if the first preset byte is a second preset value; performing corresponding operation and returning to Step S2' if the first preset byte is the other value;

the process of sending a response that the data received does not meet a condition of the operation to the upper computer according to the system working mode via a corresponding interface, returning to Step S2 in Step S7' is replaced with Step S7'-1 to Step S7'-2:

Step S7'-1, determining whether the apple interface sending data flag is set, if yes, resetting the apple interface sending data flag, sending the response that the data received does not meet the condition of the operation to the upper computer via the apple interface, and returning to Step S3', otherwise, executing Step S7'-2;

Step S7'-2, determining whether the USB sending data flag is set, if yes, resetting the USB sending data flag, returning the response that the data received does not meet the condition of the operation to the upper computer via the USB interface, and returning to Step S2', otherwise, returning to Step S2;

returning to Step S4 in Step S5 is replaced with returning to Step S2';

sending the encrypted result to the upper computer via a corresponding interface according to the system working mode and returning to Step S2 in Step S8' is replaced with Step S8'-1 to Step S8'-2:

Step S8'-1, determining whether the apple sending data flag is set, if yes, resetting the apple sending data flag, sending the encrypted result to the upper computer via the apple interface, and returning to Step S3', otherwise, executing Step S8'-2; and Step S8'-2, determining whether the USB sending data flag is set, if yes, resetting the USB sending data flag, sending the encrypted result to the upper computer via the USB interface, and returning to Step S2', otherwise, directly returning to Step S2'.

6. The method as claimed in claim 1, wherein, choosing a corresponding interface according to the system working mode specifically is that determining the system working mode, choosing the apple interface if the system working mode is apple mode; while choosing the USB interface if the system working mode is USB mode.

7. The method as claimed in claim 1, wherein, determining the system working mode in Step S2 specifically comprises:

Step Y1, determining whether the card reader connects to the upper computer via an apple interface, if yes, the system working mode is apple mode, otherwise, executing Step Y2; and Step Y2, determining whether the card reader connects to the upper computer via a USB interface, if yes, the system working mode is USB mode, otherwise, returning to Step Y1 after a preset time.

8. The method as claimed in claim 1, wherein, determining the system working mode specifically comprises:

Step Y1', determining whether the card reader connects to the upper computer via a USB interface, if yes, the system working mode is USB mode, otherwise, executing Step Y2'; and Step Y2', determining whether the card reader connects to the upper computer via an apple interface, if yes, the system working mode is apple mode, otherwise, returning to Step Y1' after a preset time.

9. The method as claimed in claim 1, wherein, in Step S5, updating the initial encryption key and the key serial number in the card reader according to the second instruction specifically comprises:

obtaining, by the card reader, the initial encryption key and making the initial encryption key as a current key, in which the algorithm corresponding to the algorithm flag and the current key is configured to decrypt a ciphertext in the second instruction to get a plaintext in the second instruction; determining whether the plaintext is legitimate, if yes, updating the initial encryption key and the key serial number in the card reader according to the plaintext in the second instruction, otherwise, reporting an error to the upper computer according to the system working mode via a corresponding interface, and returning to Step S4.

10. The method as claimed in claim 9, wherein, obtaining, by the card reader, the initial encryption key and making the initial encryption key as the current key specifically comprises:

determining whether an initial encryption key exists in the card reader, if yes, obtaining the initial encryption key from the card reader and making it as the current encryption key, otherwise, making a default initial encryption key as the current encryption key.

11. The method as claimed in claim 9, wherein, determining whether the plaintext in the second instruction is legitimate specifically comprises:

verifying whether a length of the plaintext in the second instruction is legitimate, verifying whether a filled character of the plaintext in the second instruction is legitimate, and verifying whether a check code of the plaintext in the second instruction is legitimate;

if all of the length of the plaintext in the second instruction, the filled character of the plaintext in the second instruction and the check code of the plaintext in the second instruction are legitimate, the plaintext in the second instruction is legitimate; otherwise, the plaintext in the second instruction is not legitimate.

12. The method as claimed in claim 11, wherein, verifying whether the length of the plaintext in the second instruction is legitimate specifically comprises: determining whether the length equals a first preset length, if yes, the length of the second instruction is legitimate, otherwise, sending a first error response to the upper computer according to the system working mode via a corresponding interface, and returning to Step S4;

verifying whether a filled character of the plaintext in the second instruction is legitimate specifically comprising: obtaining, by the card reader, the filled character from the plaintext in the second instruction, determining whether the filled character matches with a sixth preset value, if yes, the filled character is legitimate, otherwise, sending a second error response to the upper computer according to the system working mode via a corresponding interface, and returning to Step S4; and verifying whether the check code in the plaintext in the second instruction is legitimate specifically comprising: calculating, by the card reader, an appointed part in the plaintext in the second instruction to get a verification result, obtaining the check code from the plaintext in the second instruction, and determining whether the check code is identical to the verification result, if yes, the check code in the plaintext in the second instruction is legitimate, otherwise, sending a third error response to the upper computer according to the system working mode via a corresponding interface, and returning to Step S4.

13. The method as claimed in claim 12, wherein, obtaining the filled character from the plaintext in the second instruction specifically is that starting from a third preset byte of the plaintext in the second instruction, obtaining data of a second preset length, and making the data as the filled character.

14. The method as claimed in claim 12, wherein, obtaining the check code from the plaintext in the second instruction specifically is that starting from a fourth preset byte of the plaintext in the second instruction, obtaining data of a fourth preset length, and making the data as the check code.

15. The method as claimed in claim 12, wherein, the appointed part of the plaintext in the second instruction specifically is that starting from the first preset byte of the plaintext in the second instruction, obtaining data of a third preset length.

16. The method as claimed in claim 12, wherein, obtaining the initial pin encryption and the key serial number from the plaintext in the second instruction specifically comprises:

starting from the first preset byte of the plaintext in the second instruction, obtaining data of a fifth preset length and making the data as the initial pin encryption; starting from a fifth preset byte of the plaintext in the second instruction, obtaining data of a sixth preset length and making the data as the key serial number.

\* \* \* \* \*